Nov. 16, 1954  C. G. MUENCH  2,694,648
METHOD OF SATURATING FIBERBOARD
Filed Jan. 31, 1950  4 Sheets-Sheet 1

INVENTOR
Carl G. Muench
By Edw. A. Hampson
Attorney

Nov. 16, 1954  C. G. MUENCH  2,694,648
METHOD OF SATURATING FIBERBOARD
Filed Jan. 31, 1950  4 Sheets-Sheet 4

INVENTOR
Carl G. Muench.
By Edw. A. Hampson
Attorney ered Nov. 16, 1954

2,694,648

METHOD OF SATURATING FIBERBOARD

Carl G. Muench, Glenview, Ill., assignor to The Celotex Corporation, Chicago, Ill., a corporation of Delaware Application January 31, 1950, Serial No. 141,527

13 Claims. (Cl. 117—44)

This invention relates to a new and improved apparatus for saturating, together with a new and improved method of saturation. The saturation referred to is particularly utilized in the saturation of the edges of fiber insulation boards, and its particular purpose is that of providing an apparatus wherein, in commercial manufacture, a high rate of production may be achieved.

The invention further comprehends the production of a vapor sealed fiberboard product, that is, one wherein the surfaces thereof are sealed by limited surface saturation with an asphalt or other sealer, and the process of producing such product in which, in particular, the peripheral edges thereof are reinforced.

In the past, the edges of sheet materials, as, for example, fiber insulation board, have been saturated by passing such sheets on edge by hand, or by suitable mechanism, through a shallow layer of the saturant, or, by hand, or by suitable mechanism, dipping the edges of the sheets to the required depth in the saturant.

The method or the mode of obtaining the edge saturation at a high production rate by the use of the apparatus herein disclosed involves the stacking of a number of sheets, the edges of which are to be saturated and the supply of the saturant to the edges of such stack, with provision being made for continually moving the elements from the bottom of the stack and adding fresh elements to the top of the stack so that the operation is a continuous operation.

The sheet-form material, after having had its edges suitably saturated according to the preceding, may then, by suitable steps, be additionally surface-saturated to a predetermined degree, whereby there results a surface sealed sheet, the edges of which are reinforced.

This application is a division of prior application Serial No. 624,505 filed October 25, 1945, entitled "Apparatus for Saturating Board Edges," granted as Patent No. 2,530,026 on November 14, 1950.

In particular, the objects of the invention hereof are the production of a surface sealed or vaporproofed fiberboard sheet, the peripheral edges of which are additionally reinforced, and the provision of new and novel steps of processing for the production of such product.

Briefly described, the device for carrying out the invention comprises a feed means for feeding successive sheets in horizontal position into a vertical hopper to form a pile of sheets, the edges of which are exposed. The hopper, to at least a portion of its height, is provided with suitable openings so that by surrounding a portion of the hopper with a suitable enclosure, or the like, the saturant may be fed into such enclosure to flow from the openings provided in the sides of the hopper to thereby bring into contact with the edges of the stack of material in the hopper a layer of saturant which is being continually replaced by additional saturant discharged through the openings in the walls of the hopper. At the bottom of the stack of sheets referred to, there is provided a conveyor mechanism which successively removes the sheets from the bottom of the stack and carries them to a tank saturator, or coater, where the surfaces of the entire sheet may be further saturated or coated. Or this take-off conveyor may convey the edge saturated sheets to any other apparatus for subsequent fabricating or manufacturing operations.

The saturating apparatus is illustrated in the accompanying drawings, wherein—

Figure 1:
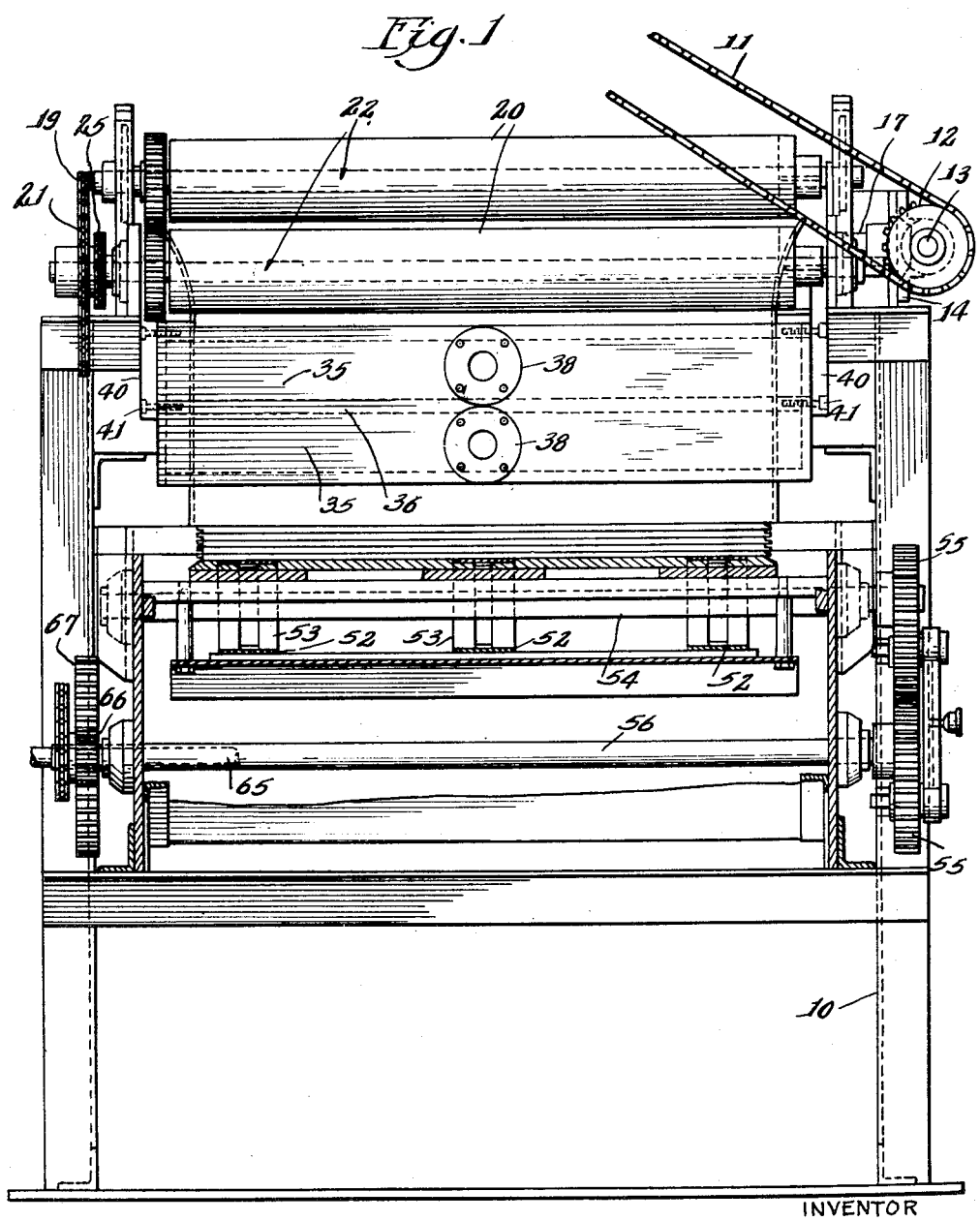
Figure 1 is an end view of the apparatus, some parts being broken away for clearness of illustration.
Figure 2:
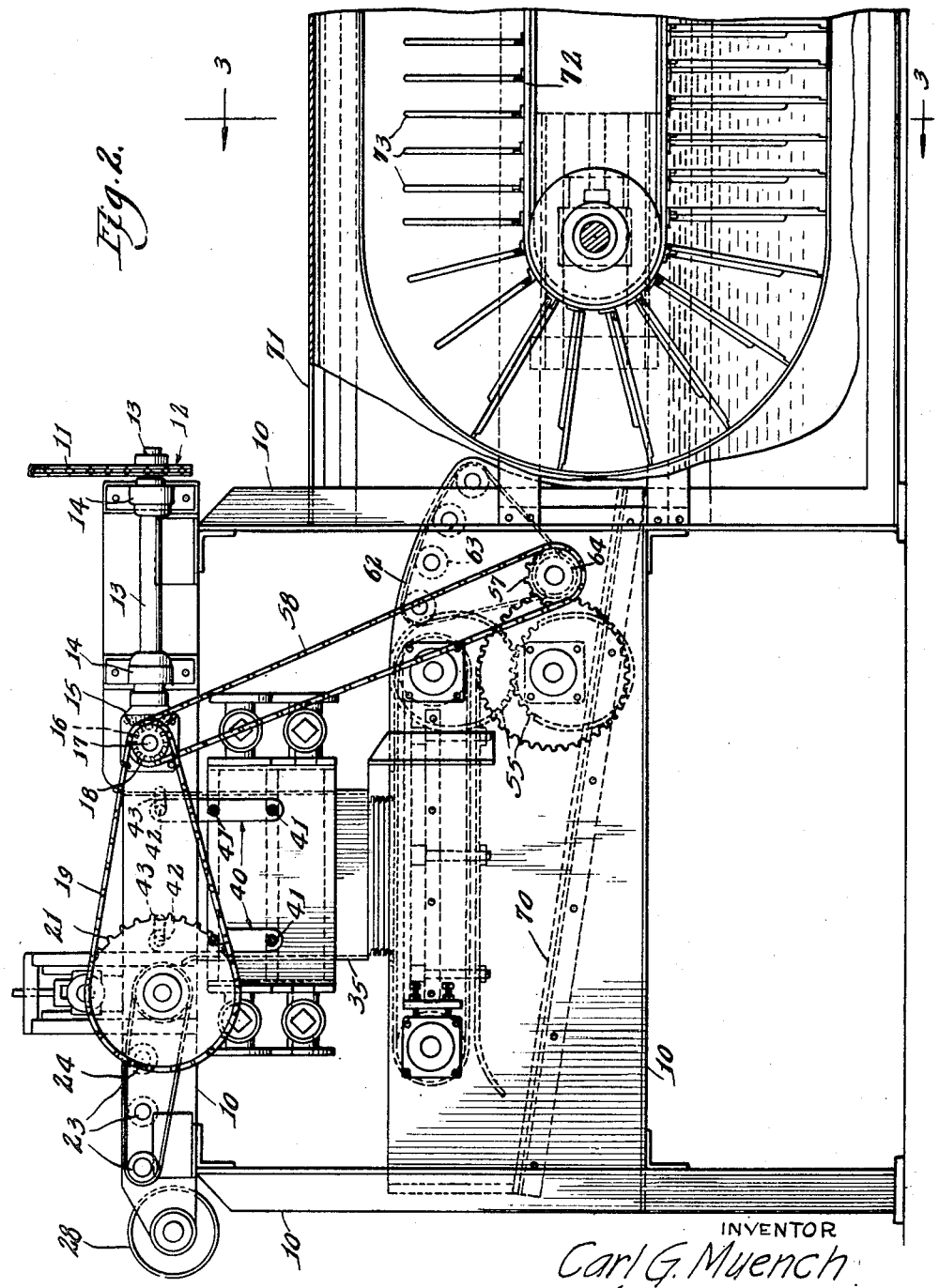
Figure 2 is a side elevation of the saturator.
Figure 3:
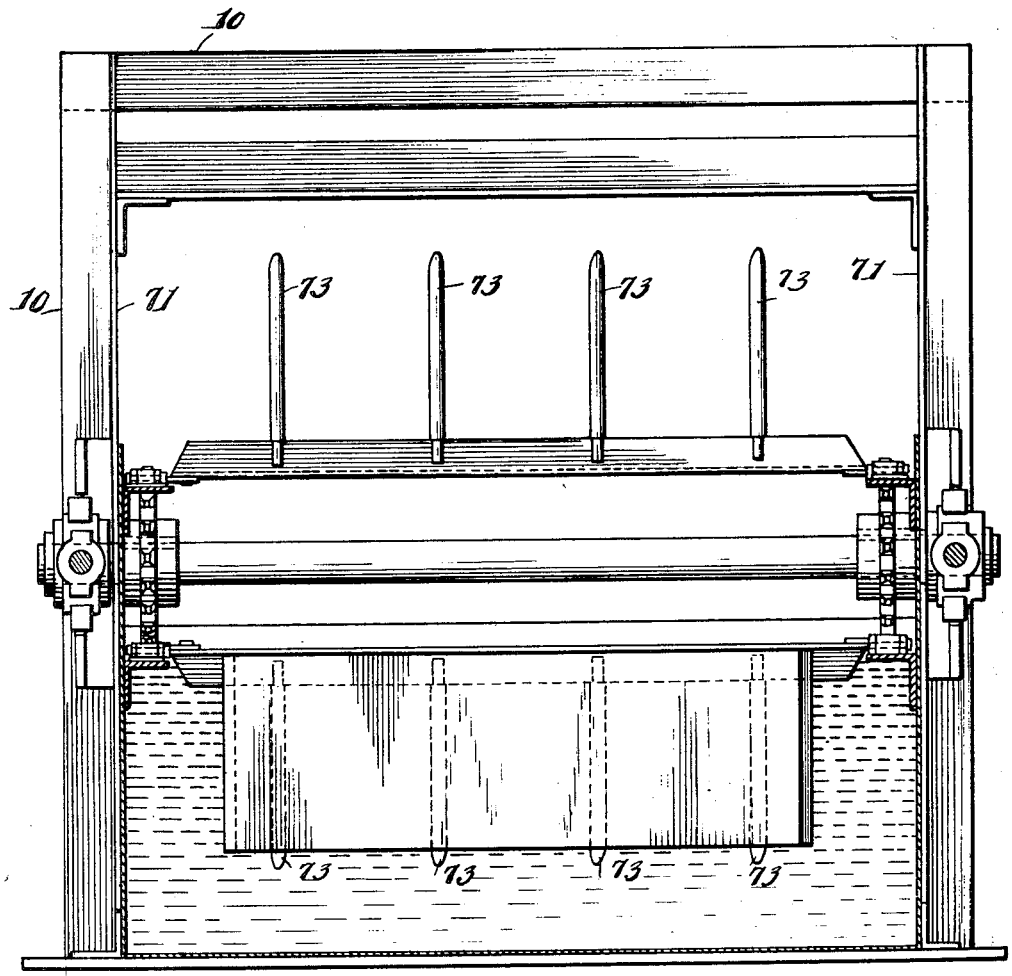
Figure 3 is a section through Figure 2 taken on line 3—3.

In the drawings, the saturator device comprises, of course, a suitable structural framework generally designated by the numeral 10, and on which are mounted the various elements of the device which are driven by chain 11. Chain 11 drives a sprocket 12 which is mounted on a driving shaft 13 mounted in bearings 14 which, in turn, are suitably secured to a portion of the main frame 10. On the other end of shaft 13 there is provided a bevel gear 15 which, in turn, drives bevel gear 16 which is mounted on shaft 17 positioned at right angles to shaft 13.

On shaft 17 there is also mounted a small sprocket wheel 18 which, through chain 19, drives feed rolls 20 by means of sprocket 21 which is mounted on shaft 22 of the lower feed roll 20.

For carrying sheets or boards to the feed rolls 20 to be fed into the hopper of the device, there is provided a suitable conveyor which is shown as comprising three driven rolls 23 carrying suitable conveyor belt or chain 24. Feed rolls 23 may be driven by a suitably mounted sprocket, not shown, driven from sprocket wheel 25 by means of a connecting drive chain.

Provision may be made, of course, for adjusting the feeding conveyor by mounting the left hand feed roll 23 adjustable horizontally, an adjustment which is well known to those skilled in the art, or any other usual means may be employed for taking up any slack in conveyor belt 24. The illustration of means for taking up any slack in conveyor belt 24 has been omitted from the drawings in the interest of simplifying and making the drawings more readily understandable.

Means also are preferably provided for adjusting feed rolls 20 to provide for feeding of materials of varying thickness and, as illustrated, the shaft 22 of the upper feed roll 20 is mounted in a vertically adjustable bearing 26 which, by a suitable screw, as is well understood, may be adjusted vertically on guides 27.

Sheets of fiber board or the like which may be fed from a suitable conveyor, which is indicated by roll 28, are fed to the feed conveyor belt 24 to the feed rolls 20 by which the boards are fed to the hopper where they are saturated.

The hopper, which is located ahead of the feed rolls 20, is in effect merely a box having an open top and bottom and which is formed by the walls 33. In order that the hopper 33 may properly receive the sheets fed by rolls 20, the wall adjacent the rolls 20 terminates at some distance below the top of the lower roll 20; whereas, on the other hand, the far wall of the hopper extends upwardly to above the top of the bottom roll 20 so that sheets projected from feed rolls 20 will be properly received in the hopper to form a stack of boards therein. What might be termed the side walls, as distinguished from the back and front walls of the hopper, are not illustrated in the drawing, but they will readily be visualized as completing the walls forming the open box hopper, and the upper portions of these side walls may, of course, be slightly flared, as are the upper portions of the back and front walls of the hopper, as such walls are illustrated in the drawings. By the outward flare of the top edges of the outer walls of hopper 33, the sheets as they are delivered are guided so as to stack evenly within the hopper.

The sides of the hopper 33, where it is desired that the edges of the boards in the hopper be saturated, the walls are provided with a large number of small openings or perforations 34, the size of which and spacing, while not critical, will, for any particular conditions of saturation, necessarily have to be determined experimentally. In connection with the perforations 34 through the walls of hopper 33, these should be of such size and spacing that the saturant will discharge through these openings 34 at a rate greater than that at which the saturant is absorbed by the edges of the stack of boards in the hopper. Excess saturant may find its way down around the edges of the pile of sheets and drain into receptacle 70. Of course, it follows that if the edges of the boards are highly absorbent, then a larger amount of saturant must be fed through the openings 34 than in a case where the edges of the board are not so absorbent. Also the quantity of the saturant which it is desired should be absorbed by the edges of the board and the flow characteristic of the saturant enter into the determination of the size of the openings and their spacing. Still further, the saturant itself is also a determining factor in connection with the size and spacing of the openings 34, that is, for example, if the saturant is relatively non-fluid, that is, is relatively viscous, then the size of the openings and the number of openings must be relatively large so that sufficient saturant will pass through. Whereas, on the other hand, if the saturant, under conditions of use, is relatively fluid, then the openings may be smaller and the spacing of the openings greater. For use with ordinary saturating asphalt with a melt point of about 140° F., or thereabouts, and for a fairly thorough saturation of the edges of average fiber insulation board, the holes will be about one-fourth inch in diameter spaced one inch center to center. Of course, the amount of the saturant which passes through openings 34 may be varied more or less depending on the pressure at which the saturant is supplied, and within any reasonable range the size of perforations and spacing, as previously mentioned, will be satisfactory through a considerable range of variation of saturating conditions. It is, of course, to be understood that the amount of saturant absorbed by the edges of the sheets of the boards may be varied by operating the device more slowly or more rapidly, in which case the device, with otherwise fixed conditions of saturation, if operated more rapidly, will saturate the individual sheets to a lesser amount; whereas, if the apparatus is operated more slowly, the edges of the individual sheets will be more heavily saturated.

Surrounding the hopper 33 there is a saturant chamber 35 which may be integral with the hopper walls 33 or may be fabricated from individual parts, as desired. The purpose of the saturant chamber is merely that of providing a chamber, one side of which comprises a wall of hopper 33 having the openings or perforations 34 therethrough, and it will, of course, be understood that the specific manner of construction of the saturant chamber 35 is relatively immaterial so long as its function is served.

As shown, in order to maintain a relatively uniform flow of the saturant through the perforations 34, the saturant chamber is divided into two parts by a partition 36, and each of the separate upper and lower saturant chambers so provided are also provided with a suitable inlet 37 and outlet 38, each such inlet and outlet being provided with a suitable valve 39. By the provision of the inlet and outlet for each saturant chamber 35, and by the manipulation of the valve 39, a constant flow of heated saturant may be maintained through the saturating chambers in addition to that quantity of the saturant which exudes through perforations 34, and thus by maintaining a continuous flow of excess hot saturant through the saturant chambers 35, the saturating material does not have an opportunity to cool and harden in the saturating chambers. Of course, the saturating chambers need not be limited to two separate chambers 35, and it will, of course, be understood that should there be a greater amount of saturant to be absorbed by the edges of the boards in the hopper than can be supplied with the perforations and saturant chambers, as shown, that without involving invention, the height of the hopper 33 may be increased and additional perforations and enclosing saturant chambers 35 may be provided.

Figure 4:
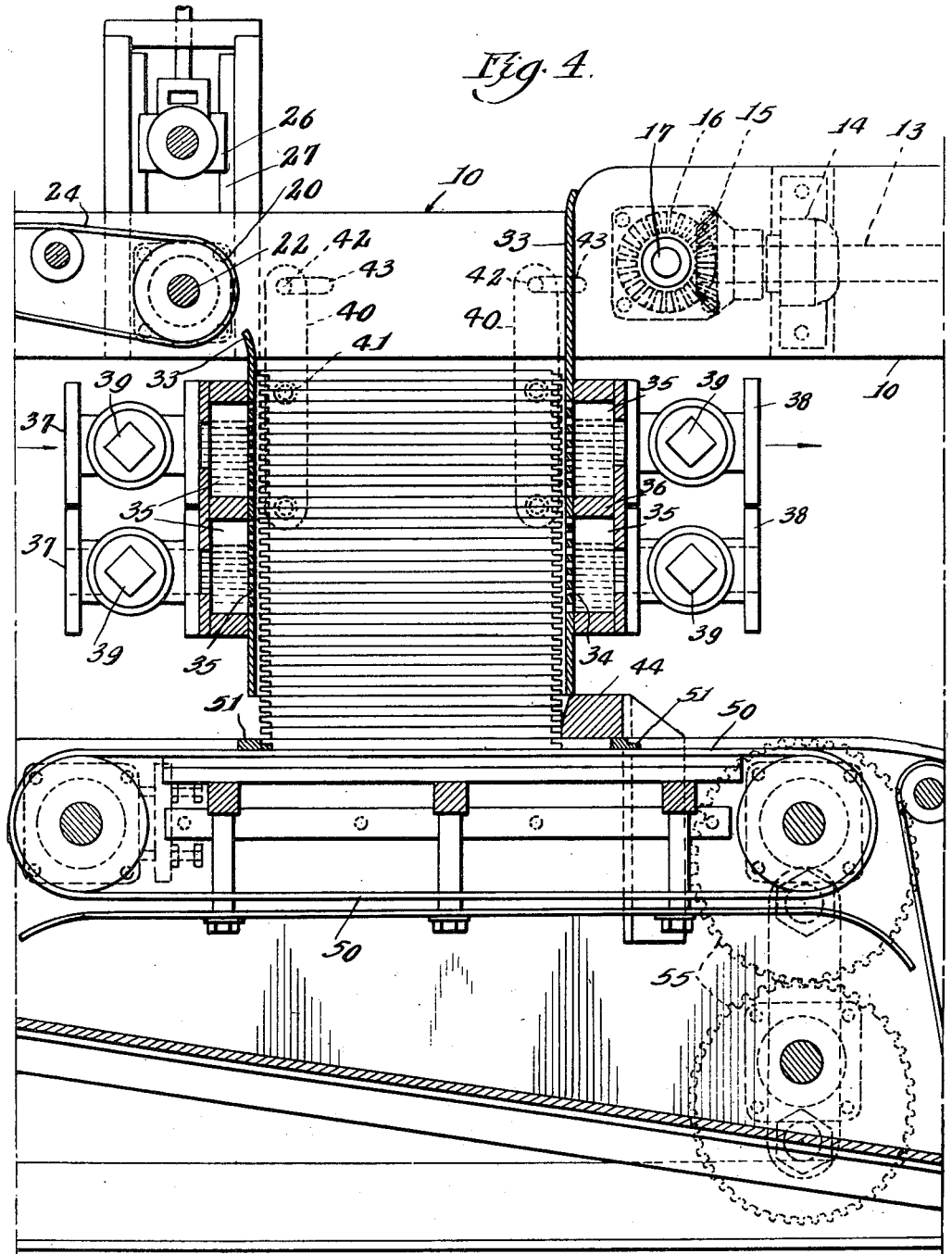
Figure 4 is an enlarged view particularly in section of the principal parts of the apparatus.

The saturant chamber 35 and the walls 33, forming a hopper as a unit, are mounted so that if required for proper reception of the boards to be saturated this unit may be adjusted laterally. The lateral adjustment of the hopper unit is possibly due to its suspended mounting comprising straps 40, which are suitably secured to the side walls of hopper 33 by bolts or rivets 41, and extend upwardly above the side walls. The upper ends of the straps 40 are mounted on bolts 42 which pass through longitudinal slots 43 in a portion of the machine frame, as is clearly apparent in particular in Figure 4 of the drawing. By the mounting of the upper ends of straps 40 from longitudinal slots 43, it consequently follows that hopper 33 may be readily adjusted forwardly or back to the extent of the length of such slots 43.

At the bottom of hopper 33, along the front edge of the hopper, there is provided an abutment or stop 44 which, it will be noted, is so positioned as to prevent a forward movement of any except the bottom board in the stack of boards in hopper 33. Of course, instead of providing a separate aboutment 44, the front wall of hopper 33 might be extended downwardly in lieu thereof.

Positioned below the hopper 33 there is provided a take-off conveyor 50 which is so positioned below the hopper that it will remove one by one the bottom-most sheet of the stack of boards issuing from the hopper at the bottom. Conveyor 50 is provided with flights or stops 51 which, in connection with the particular edge construction of the boards, as shown in the drawing, a shiplapped edge, has a stepped construction complemental to the form of the board edge. Conveyor 50, as shown, comprises chains 52 which run on wheels 53 in turn mounted on a shaft 54 and driven by gears 55, which are oval gears designed to provide for a slow pickup of the load with acceleration after the initial pickup so as to rapidly remove the board from the stack after it has been contacted by flight 51.

The lower gear 55 is mounted on a shaft 56 carrying sprocket 57 and driven by chain 58 which is driven by a sprocket mounted on driving shaft 17.

Conveyor 50 discharges the edge-saturated sheets onto a discharge conveyor 62 which runs over conveyor rolls 63 being driven by a driven conveyor roll 64. Driven conveyor roll 64 is mounted on shaft 65 driven by gear 66 which meshes with gear 67 which is mounted on shaft 56.

In the drawing, various details in connection with the take-off conveyor 50 are shown, such as a take-up adjustment and slide ports for the conveyor sheets, but since such details are well known to those skilled in the art they will not be described, such description not being necessary to an understanding of the invention.

Below the take-off conveyor 50 and discharge conveyor 62 there is provided a downwardly sloping trough or receptacle 70 which will catch any excess saturant which may be discharged from the saturating portion of the device, and such excess material, due to the inclination of trough 70, will be discharged into a surface saturator which is shown as associated with the apparatus which has heretofore been described.

The surface saturator comprises a tank 71 in which is maintained a pool of the material with which the sheets are to be surface saturated. In tank 71 there is suitably mounted a leaf conveyor generally designated at 72, and provided with leaves 73, between which the edge-saturated sheets are discharged, which is clearly apparent in the drawings. The leaf conveyor 72 submerges the individual sheets or boards in the pool of saturant contained in tank 71, and at the far end of this tank, as the surface-saturated boards are brought above the surface of the saturant by the movement of the conveyor, they may be removed therefrom in any desired manner.

It will be seen that in the foregoing there has been described an apparatus for accomplishing in production the high speed fiber board edge saturation, and wherein, by suitable variation of the various features of operation, as will be well understood by those skilled in the art, a controllable edge saturation may be carried out.

Briefly summarizing the operation of the apparatus, the fiber boards, or similar sheets, the edges of which are to be saturated, are fed to the apparatus over feed rolls 28, and by conveyor belt 24 are fed to what might be termed the stacking rolls 20. These latter stacking or feed rolls 20 discharge the individual sheets, one on top of another, received in hopper 33 wherein a solid aligned stack of boards is built up.

In the hopper 33, the walls of the hopper are provided with multitudinous openings through which the saturant exudes, so that the edges of the pile of sheets in the hopper are, during their travel through the hopper, continuously subjected to a film or layer of the saturant issuing from the inner face of the hopper walls. By proper co-relation of the properties of the saturant and of the rate of passage of the pile of boards through the hopper, any desired degree of saturation may be obtained.

Below hopper 33 there is provided a take-off conveyor which comprises chains 50 carrying formed flights 51 which successively remove from the bottom of the pile the lower-most sheet of the pile and carry it away to keep the pile of boards in hopper 33 moving downwardly through the hopper to accommodate boards as they are supplied at the top of the pile.

The boards, the edges of which have been saturated in accordance with the foregoing, are carried by conveyor chains 50 to a discharge conveyor 62 which discharges the individual sheets into the spaces between the leaves 73 of conveyor 72 in a saturating tank, wherein the such conveyor 72 carries the individual boards into a pool of saturant and finally brings the boards above the surface of the saturant, whereupon they may be removed from the conveyor.

The inventions hereof having been described in detail, what I claim is:

1. The process of saturating an edge of a sheet of felted fiber board and comprising the steps: establishing a pile of sheets to be treated, maintaining such pile of sheets while traversing each sheet of the pile from the top to the bottom of the pile by successively adding sheets to the top of the pile and successively removing sheets from the bottom of the pile, establishing against a side face of the pile of sheets a body of liquid saturant under pressure and constantly supplying liquid saturant under pressure to the body of saturant.

2. The method of operation of a device for saturating edge portions of porous sheet material and comprising the steps; establishing a body of liquid saturant, constituting an edge face of porous sheet material as a confining surface of the body of saturant, placing the body of saturant under pressure and maintaining the body of saturant under pressure by supplying liquid saturant under pressure thereto at a rate at least equal to the rate of absorption of the saturant into the edge face of the porous sheet material.

3. The method of operation of a device for saturating edge portions of porous sheet material and comprising the steps; establishing a body of liquid saturant, constituting an edge face of a stack of superposed like porous sheet form units as a confining surface of the body of saturant, placing the body of saturant under pressure, traversing the porous confining surface across the surface of the confined saturant and maintaining the body of saturant under pressure by supplying liquid saturant under pressure thereto at a rate exceeding the rate of absorption of the saturant into the porous confining surface.

4. The method of operation of a device for saturating edge portions of porous sheet form material and comprising the steps; establishing a body of liquid saturant, forming an adsorptive plane surface by superposing porous sheets of material with like edges lined up and providing a substantially plane, porous surface, constituting such substantially plane, porous surface a confining surface of the body saturant, placing the body of saturant under pressure, traversing said plane, porous surface across the surface of the body of saturant under pressure, maintaining the said confining surface while so traversing, by serially removing sheets from one end of the stack and substantially concomitantly adding sheets at the other end of the stack and while the sheet is traversing the surface of the confined body of saturant, maintaining the body of saturant under pressure by supplying thereto under pressure additional liquid saturant applied at a rate at least equal to the rate at which saturant is adsorbed into the plane, porous confining surface.

5. The process of saturating an edge of a sheet of felted fiber board and comprising the steps: establishing a pile of sheets to be treated, maintaining such pile of sheets while traversing each sheet of the pile from the top to the bottom of the pile by successively adding sheets to the top of the pile and successively removing sheets from the bottom of the pile, establishing against a side face of the pile of sheets a body of fluid thermoplastic saturant under pressure and constantly supplying liquid saturant under pressure to the body of saturant.

6. The process of saturating an edge of a sheet of felted fiber board and comprising the steps: establishing a pile of sheets to be treated, maintaining such pile of sheets while traversing each sheet of the pile from the top to the bottom of the pile by successively adding sheets to the top of the pile and successively removing sheets from the bottom of the pile, establishing against a side face of the pile of sheets an asphaltic fluid saturant under pressure and constantly supplying liquid saturant under pressure to the body of saturant.

7. The process of saturating an edge of a sheet of felted fiber board and comprising the steps: establishing a pile of sheets to be treated, maintaining such pile of sheets while traversing each sheet of the pile from the top to the bottom of the pile by successively adding sheets to the top of the pile and successively removing sheets from the bottom of the pile, establishing against a side face of the pile of sheets a body of asphalt saturant under pressure and constantly supplying liquid saturant under pressure to the body of saturant.

8. The process of saturating an edge of a sheet of felted fiber board and comprising the steps: establishing a pile of sheets to be treated, maintaining such pile of sheets while traversing each sheet of the pile from the top to the bottom of the pile by successively adding sheets to the top of the pile and successively removing sheets from the bottom of the pile, establishing against a side face of the pile of sheets a body of hot fluid asphalt saturant of about 140° F. m. p. and constantly supplying liquid saturant under pressure to the body of saturant.

9. The method of operation of a device for saturating edge portions of porous sheet material and comprising the steps; forming a stack of substantially like sheets of porous material, establishing a body of fluid thermoplastic saturant, constituting an edge face of the porous sheet material as a confining surface of the body of the saturant, placing the body of saturant under pressure and maintaining the body of saturant under pressure by supplying additional said fluid saturant under pressure thereto at a rate at least equal to the rate of absorption of the saturant into the edge face of the porous sheets comprising the said confining surface.

10. The method of operating a device for saturating edge portions of sheet material and comprising the steps; forming a stack of porous sheet form material, establishing a body of hot asphaltic saturant, constituting an edge face of the said stack of sheet material as a confining surface of the body of said saturant, placing the said body of saturant under pressure and maintaining the said body of saturant under pressure by supplying additional of said saturant under pressure thereto at a rate at least equal to the rate of absorption of the said saturant into the edge face of the said stack.

11. The method of operation of a device for saturating edge portions of porous sheet material and comprising the steps; establishing a body of liquefied asphaltic saturant, constituting an edge face of a stack of superposed like porous sheet form units as a confining surface of the body of said saturant, placing the body of said saturant under pressure, traversing the porous confining surface across the surface of the said saturant and maintaining the body of said saturant under pressure by supplying said saturant under pressure thereto at a rate exceeding the rate of absorption of the said saturant into the porous confining surface.

12. The method of operation of a device for saturating edge portions of porous sheet material and comprising the steps; establishing a body of substantially hot liquid asphalt, constituting an edge face of a stack of superposed like porous sheet form units as a confining surface of the body of said saturant, placing the body of said saturant under pressure, traversing the porous confining surface across the surface of the said saturant and maintaining the body of said saturant under pressure by supplying said saturant under pressure thereto at a rate exceeding the rate of absorption of the said saturant into the porous confining surface.

13. The method of operation of a device for saturating edge portions of porous sheet form material and comprising the steps; establishing a body of asphalt, forming an adsorptive plane surface by superposing porous sheets of material with like edges lined up and providing a substantially plane, porous surface, constituting such substantially plane, porous surface a confining surface of the body of said saturant, placing the body of said saturant under pressure, traversing said plane, porous surface across the surface of the body of said saturant under pressure, maintaining the said confining surface while so traversing, by serially removing sheets from one end of the stack and substantially concomitantly adding sheets at the other end of the stack and while the sheet is traversing the surface of the confined body of said saturant, maintaining the body of said saturant under pressure by supplying thereto under pressure additional said saturant applied at a rate at least equal to the rate at which said saturant is adsorbed into the plane, porous confining surface.

References Cited in the file of this patent

UNITED STATES PATENTS

| Number | Name | Date |
|---|---|---|
| 1,265,127 | Sleeper | May 7, 1918 |
| 1,482,090 | Overbury | Jan. 29, 1924 |
| 1,752,454 | Overbury | Apr. 1, 1930 |
| 2,000,226 | Fry | May 7, 1935 |
| 2,219,381 | Codwise | Oct. 29, 1940 |
| 2,361,818 | Brightwell | Oct. 31, 1944 |
| 2,430,641 | MacKenzie | Nov. 11, 1947 |